United States Patent [19]

English

[11] Patent Number: 5,249,509
[45] Date of Patent: Oct. 5, 1993

[54] DEVICE TO VARY STRENGTH OF A BREWED BEVERAGE

[76] Inventor: Philip H. English, 0109 Ptarmingon Ct., Avon, Colo. 81620

[21] Appl. No.: 789,031

[22] Filed: Nov. 7, 1991

[51] Int. Cl.⁵ .............................................. A47J 31/02
[52] U.S. Cl. ...................................... 99/285; 99/295; 99/299; 99/305; 99/306
[58] Field of Search .................. 99/299, 306, 295, 300, 99/304, 305, 285; 426/433

[56] References Cited

U.S. PATENT DOCUMENTS

| | | | |
|---|---|---|---|
| 3,823,656 | 7/1974 | Vander | 99/306 |
| 4,056,050 | 11/1977 | Brown | 99/305 |
| 4,446,158 | 5/1984 | English | 99/304 |
| 4,697,502 | 10/1987 | English | 99/299 |
| 4,811,657 | 3/1989 | Rixen | 99/299 |
| 4,843,955 | 7/1989 | Henn | 99/299 |

Primary Examiner—Robert W. Jenkins
Attorney, Agent, or Firm—Oldham, Oldham & Wilson

[57] ABSTRACT

A device for brewing a cup or other small portion of a beverage to a desired strength is disclosed. The suitable strength is achieved by controlling the volume of hot water contacting a prepackaged, disposable filter containing beverage precursor particles. The device is adapted to control and vary the brewing process by regulating with some precision volume of hot water flowing through the filter and the volume of hot water bypassing the filter and flowing directly into a drinking cup without having contacting the brew particles. Visual indicators are provided to facilitate choosing a brew of desired strength. The process for preparation of a brewed beverage to a desired strength is also disclosed.

10 Claims, 6 Drawing Sheets

DEVICE TO VARY STRENGTH OF A BREWED BEVERAGE

FIELD OF THE INVENTION

This invention relates to a device for brewing an individual cup or other portion of a beverage, especially coffee, to a predetermined strength. More specifically, the device incorporates an adjustable brewing vessel capable of varying the brewing time and amount of hot water which contacts a beverage precursor to attain desired strength in a brewed beverage and visual markings to facilitate the choice of brew strength.

BACKGROUND OF THE INVENTION

The standard and well-known procedure for using an automatic brewing device such as "Mr. Coffee", starts with loading coffee particles on a filter, i.e., a volume of coffee particles commensurate with the volume or number of cups of coffee to be brewed. The filter with coffee particles is then placed in a brewing chamber of the coffee maker where hot water gradually flows through the filter over a period of time and the brewing process takes place. The "Mr. Coffee" filter holder incorporates a ribbed section below and alongside an adjustable control wall which retains the filter. The ribs serve as channels for water which surmounts the control wall to bypass the filter. These channels formed by the ribs serve to direct water to an opening in the bottom of the brewing chamber. As such, the ribs in the "Mr. Coffee" system are not dedicated to controlling hot water-beverage particle contact time; and, the ribs may not adequately serve to aid in controlling hot water flow time and strength of the beverage produced. Finally, the brewed coffee emanates from the brewing chamber by gravity and pours into a carafe seated on a heating element to maintain the hot temperature of the brewed coffee. But the coffee thus produced is generally uniform; i.e., all coffee brewed from successive brew cycles will have the same relative strength.

U.S. Pat. No. 4,056,050 to Brown presents a somewhat complicated means for controlling contact or brew time, wherein a selector cap with a plurality of slots in its sidewalls is rotatively coupled with a spreader, likewise having bypass slots grooved in its control wall, and the selector cap and spreader are both rotatably mounted on a bypass tube, so that when the selector cap and spreader slots are in registration, a relatively greater degree of water enters the brew chamber; and, when the selector cap is rotated to a weaker brew position, some of the corresponding slots move away from position of registry and a lesser amount of heated water enters the spreader as greater amount of water bypasses the brewing chamber through the bypass tube. Thus, water bypass for contact time and brew control is somewhat complex and is accomplished by means of the registration of a plurality of corresponding slots.

In our U.S. Pat. No. 4,446,158, there is disclosed an apparatus for making individual beverage quantities including a disposable coffee container and filter unit. Since the degree of extraction from the precursor particles is a function of the time during which hot water contacts the particles in the coffee making process, U.S. Pat. No. '158 incorporates a bypass slot or recess to allow added control for the rate of water flow through or by the coffee filter unit. The bypass simply provides a path for water not necessary to complete efficient extraction and, therefore, comprises a means to control time in a manner that is independent of the flow resistances through the filter unit. Changes in the size of the bypass slot or recess can obviously be used to control the time of the coffee making cycle and thereby control strength of the brewed beverage product. However, the apparatus for brewing disclosed in U.S. Pat. No. '158 does not incorporate a means for varying size of the bypass slot to control strength of the brewed beverage. Since the apparatus is not adapted to change size of the bypass slot, the bypass rate cannot be varied. Therefore, each unit produces a brewed beverage of uniform strength like any other brewing device or a "Mr. Coffee" in the prior art.

Our U.S. Pat. No. 4,697,502, heretofore obtained, discloses a less complex device having a means for varying size of the bypass slot and hence controlling the brew strength with use of the filter disk disclosed U.S. Pat. Nos. '158. In the '502, an adjustment ring is tapered to have a variable vertical height or wall and the ring is rotatedly carried by a mounting plate. Stated otherwise, the ring rotates relative to the mounting plate. The wall of the ring impinges a bypass slot in a side of the mounting plate for opening and closing the slot as the ring rotates on the mounting plate, thereby controlling volume of heated water bypassing the filter particles and concomitantly controlling hot water-beverage precursor contact time and strength of the brewed beverage.

The design incorporated in the U.S. Pat. No. '502 has been found impractical in many respects, among others, that the stops for opposite ends of rotation for the adjustment ring are positioned on the underside of the mounting plate, which mandates to some extent that the indicators be located on lower surface of the mounting plate. Additionally, the fact that the adjustment ring is rotatedly mounted on the plate requires construction of the apparatus from three or more components which may be found impractical for manufacture and use, not sufficiently sturdy and durable, too expensive and not commercially feasible.

In view of the various drawbacks and deficiencies in the prior art brewing devices, it is a primary object of the present invention to provide a brewing device for preparing a brewed beverage of predetermined strength by regulating hot water-particle contact time, controlling the volume of heated water bypassing filter particles, and thereby control strength of the brewed beverage.

DISCLOSURE OF THE INVENTION

There is found a need for a device which can achieve the foregoing controls by gradually varying the size of a single bypass slot, thereby regulating with some degree of precision the contact time and amount of hot water bypassing the filter, which device will concurrently indicate the brewing strength which will be attained by such gradual varying and precise regulation of hot water-filter particle contact time, and these goals to be accomplished by a more sturdy, durable apparatus having a lower cost of manufacture.

Therefore, the general object of the invention is to improve the brewing device disclosed in U.S. Pat. Nos. 4,446,158 and 4,697,502, to provide a means for brewing individual cups or other portions of brewed beverages, especially coffee, and to increase practicality of the device by positioning stops for rotatory action of the adjustment ring atop the mounting plate or base; and, similarly position the brew strength indicators on the upper surface of the mounting plate or base where the stops and visual indicators may more readily be seen and utilized.

Another object of the invention is provide a brewing device with minimal components, thereby achieving significant reductions in complexity and expense of manufacture.

Another object of the invention is to provide a brewing device with a rigid frame to receive and hold a coffee filter in a stationary position while a controlled amount of hot water flows through the filter.

Yet another object for the invention is to create a hot water reservoir atop the filter to allow for bypass of some hot water around the beverage precursor (Y), thereby to control and vary with some precision the following:

the hot water-precursor particle contact time;
the amount of hot water bypassrng the filter (Y) as a percentage of hot water entering the brewing chamber (X+Y);
the degree of extraction from precursor particles; and ultimately,
the strength of brewed beverage.

These achievements are obtained by an adjustment ring which is integrally formed with the mounting plate or base, thereby reducing the number of components for manufacture of the device.

A further objective is to provide within a brewing chamber of the device a channel mechanism forming an adjustable bypass for hot water around the filter adapted for controlling brew time, and further, for controlling the amount of hot water bypassing the filter (Y) as a percentage of hot water entering the reservoir (X+Y), and so to control with some precision the amount of hot water flowing through (X) the filter and contacting the beverage precursor particles. An increase of brew time and increased flow of hot water through the precursor particles results in a stronger brewed beverage, while adjustment of the device to reduce contact time and increase bypass of hot water around the filter (Y) produces a more weakly brewed beverage.

Still another object of the invention is to provide a brewing vessel which facilitates the choice of strength in preparing a cup or other small portion of brewed beverage and is adapted for easy adjustment according to visual indicators more practically located on the upper surface of the mounting plate or base to choose the brewing strength desired.

These and other objects of the invention will become more apparent as the specification proceeds and it is disclosed that the objectives are achieved by the following:

There is provided a saucer shaped base with upper and lower surfaces and a central aperture. The aperture is surrounded by a circular flange which is integral with the base, rises substantially perpendicular from the upper surface of the base, and which flange has a varied height. The flange has a first lowest point on the circumference of the flange and the height rises gradually around the circumference of the flange to a second highest point. The base is further provided with a circular lip projecting substantially perpendicular from the bottom of the base, the lip having a diameter greater than that of the flange. The circumference of the circular lip is dimensioned to fit into a cup.

A cup shaped vessel having an apertured center and an internal ring at the bottom surrounding the aperture, includes a first internal notch around the circumference of the ring, so that the ring of the vessel fits over the raised ridge of the flange and the vessel rotates on the base. A shoulder portion is positioned above the ring to protrude within the vessel for the purpose of holding a prepackaged beverage precursor in place. There is a longitudinal slit upward through the top half of the ring and transcending through the shoulder portion of the side of the vessel, so that when the first lowest point of the flange is juxtaposed with the slit, the longitudinal slit fully communicates with aperture to allow maximum bypass of hot water around the filter; and, as the vessel is turned around the circumference of the gradually rising flange, the longitudinal slit is gradually cut off from communication with the central aperture to effectively increase contact time by minimizing bypass of hot water around the filter.

The device includes visual indicators on the upper surface of said base indicating strength of coffee or other brewed beverage concomitant with the contact time and the relative amount of hot water passing through the longitudinal slit.

DETAILED DESCRIPTION OF THE INVENTION

Figure 1:
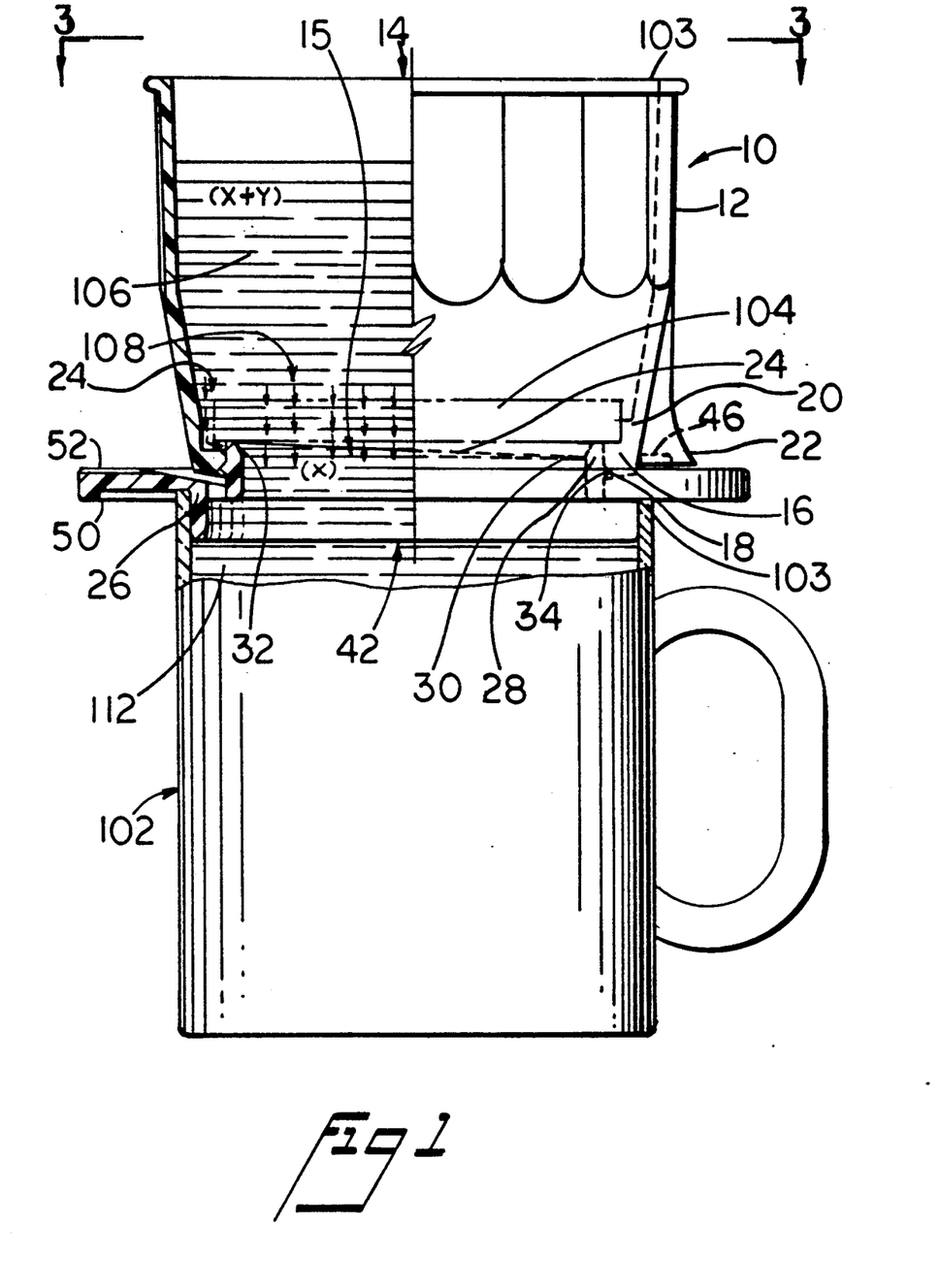
FIG. 1 is a side sectional view of the device of the present invention operatively positioned above a drinking cup with the longitudinal slit of the vessel opposed to the highest point of the flange to prevent bypass of hot water.

Specific reference is now made to FIG. 1, wherein the brewing device of this invention 10 is positioned above a drinking cup 102 as it would be while in use. A cup shaped vessel 12 with an open top 14 and bottom 15 is provided and the vessel 12 includes an internal ring portion 16 surrounding the opening at the bottom of the vessel 15 for supporting a prepackaged coffee filter 104 on the ring 16. A shoulder portion 20 above the ring 16 is adapted to hold the filter 104 in place.

The vessel 12 is rotatably mounted upon a base 26 having upper and lower surfaces 50,52 and a central opening 42 by means of an upstanding flange 28 which surrounds the opening in the base 26 and projects above the upper surface of the base 50. The flange 28 varies in height by rising smoothly from a first lowest point 30 to a second highest point 32, and the ring 16 of the vessel 12 is adapted to snap over the flange 28, thereby preventing separation of vessel 12 from base 26.

FIG. 1 further illustrates a prepackaged filter 104 containing coffee or other beverage precursor particles 111 positioned within the vessel 12. A total volume of heated water substantially equal to a cup or other portion poured into the vessel 12, forms a reservoir of heated water 106 immediately atop the prepackaged filter 104.

FIGS. 1, 1a, 2, 2a and 3 show a longitudinal slit 24 located on the inside wall of the vessel and the slit extends through the shoulder 20 above the ring 16 and down through a portion of the ring 16.

Figure 2:
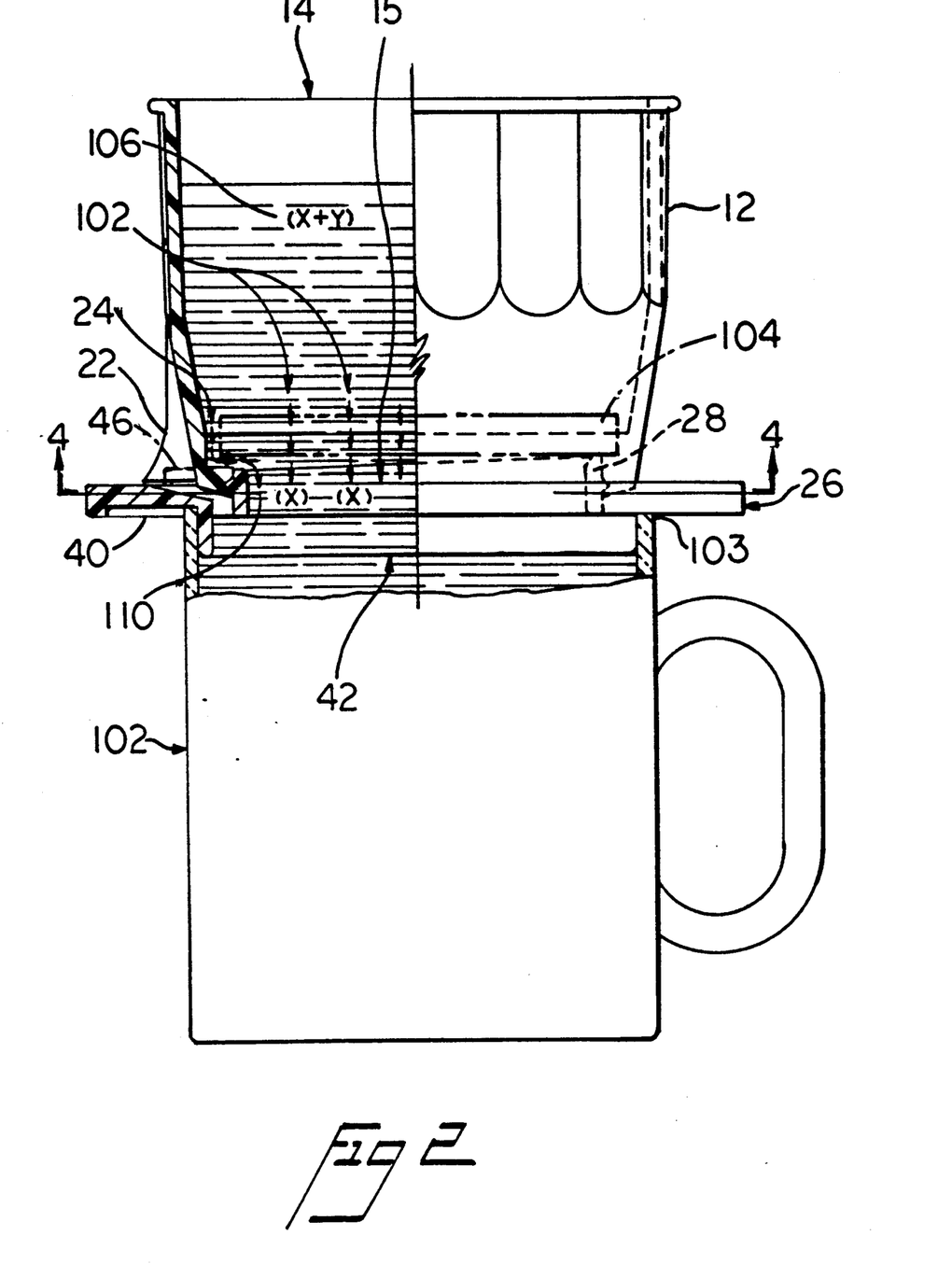
FIG. 2 is a side sectional view of the device of FIG. 1, with the vessel rotated on the base so that the first lowest point of the flange is opposed to the longitudinal slit of the vessel to allow maximum bypass of hot water around the filter.
Figure 2A:
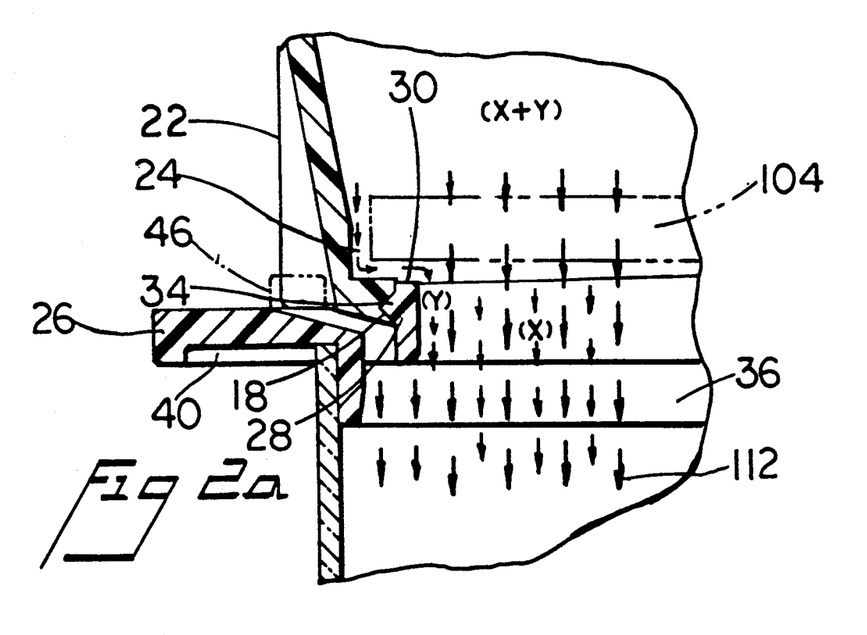
FIG. 2a is an enlarged side view from FIG. 2 showing in greater detail the longitudinal slit opposed with the first lowest point of the flange to maximize bypass of hot water around the filter.

Referring now to FIG. 2 and FIG. 2a, there is shown that rotation of the vessel 12 upon the base 26 repositions the smoothly rising flange 28 in juxtaposition with the longitudinal slit 24 to effectively vary hot water-particle contact time and the volume of water bypassing the filter (Y) and pouring directly into the drinking cup. The vessel 12 is rotatably mounted about the upstanding flange 28 of the base 26. In FIG. 2 and FIG. 2a, a first lowest portion of the tapered, upstanding flange is juxtaposed with the slit to allow a more rapid escape of hot water through the longitudinal slit 24 and around the prepackaged filter 104.

Figure 1A:
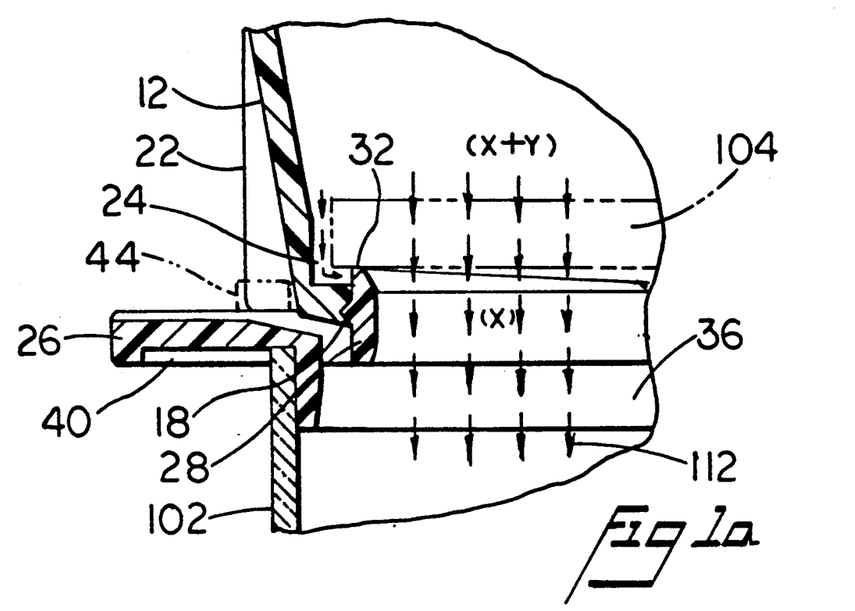
FIG. 1a is an enlarged side view from FIG. 1 showing in greater detail the longitudinal slit opposed with the second highest point of the flange to retard hot water flow through the slit.

By rotation of the vessel 12, the escape of hot water from the vessel through the longitudinal slit is retarded when the slit 24 is aligned with the second highest point of the flange 32 (FIG. 1 and FIG. 1a). The result is increased hot water-particle contact time and the reduced volume (bypass volume Y) of hot water 110 bypassing the prepackaged filter 104 which results in a stronger brewed beverage. Increased contact time and a larger extracting volume (X) of hot water passing through the filter results in a more strongly brewed beverage 112.

In order to restrain transverse movement of the vessel 12 as it rotates on the base 26, there is preferably a groove 18 on the interior wall of the ring 16 adapted to receive a ridge 34 which projects around the circumference of upstanding flange 28, whereby the ring 16 can snap over the flange 28 to retain the vessel 12 in rotatably mounted position on the base 26.

Figure 3:
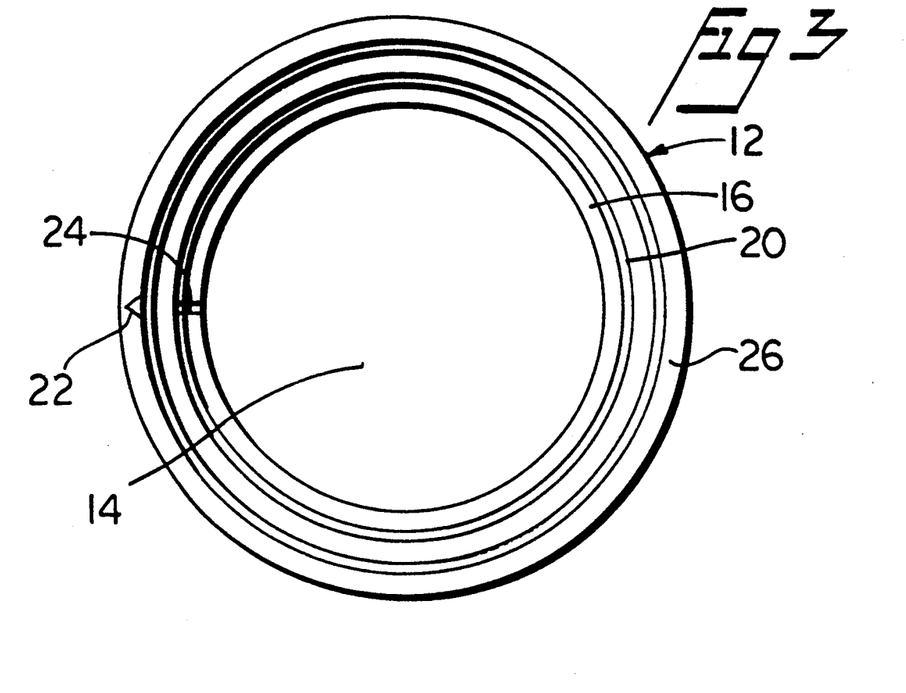
FIG. 3 is a sectional view of the cup shaped vessel taken on line 3—3 of FIG. 1.
Figure 4:
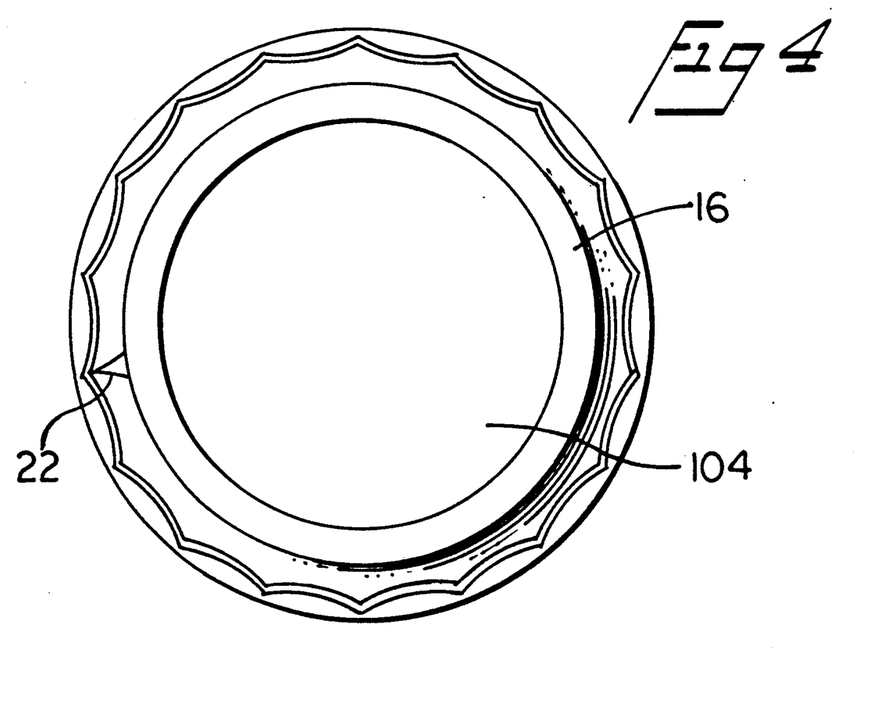
FIG. 4 is a sectional view of the base taken on line 4—4 of FIG. 2.

FIG. 3 shows a top view of the vessel prior to inserting the prepackaged filter containing beverage precursor particles; while FIG. 4 is a view from the bottom of the vessel after insertion of the filter in the vessel but with base 26 removed.

The device 10 will be further described with reference to FIG. 5 and FIG. 6, wherein the preferred embodiment is illustrated to include a lip 36 projecting from the lower surface of the saucer shaped base 26 which lip 36 surrounds the opening in the base 42 radial to the flange 28. The lip 36 is adapted to fit into and direct liquid into a drinking cup 102 or other container having a volume substantially equal to a single portion.

There is further provided a plurality of slots 38 through the saucer shaped base 26 which slots 38 are positioned adjacent to the flange 32 in the radial area between the flange 28 and the lip 36, so that the plurality of slots 38 are adapted to drain liquid from the upper surface of the base 26 into the drinking cup 102.

Figure 7:
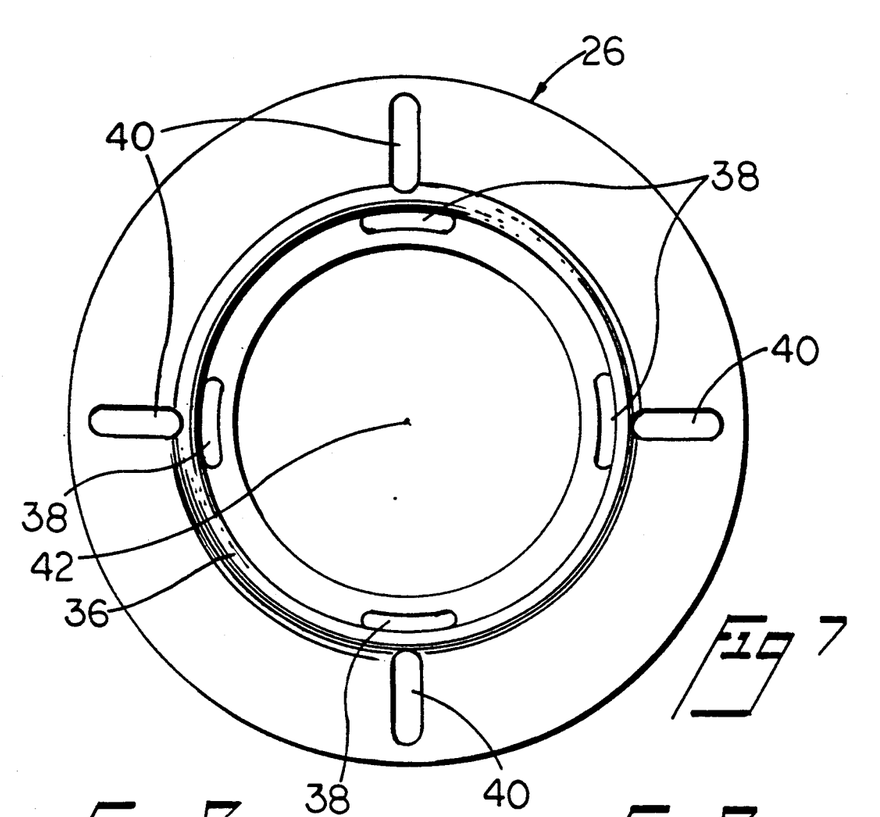
FIG. 7 is a bottom plan of the base.
Figure 8:
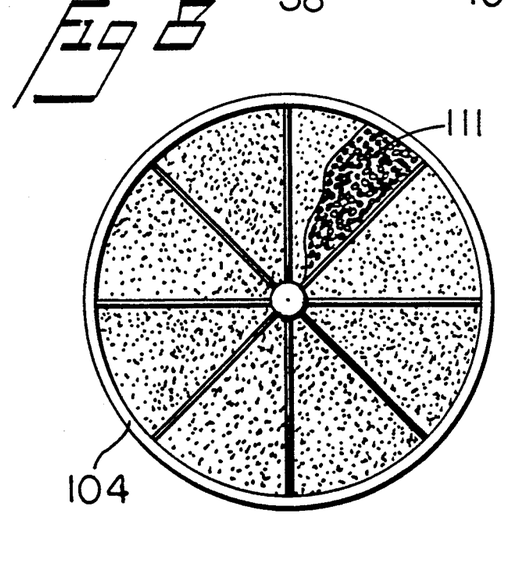
FIG. 8 is a fragmented top view of the prepackaged filter unit containing beverage precursor particles; and, FIG. 9 is a fragmented end view of the prepackaged filter unit containing precursor particles.
Figure 9:
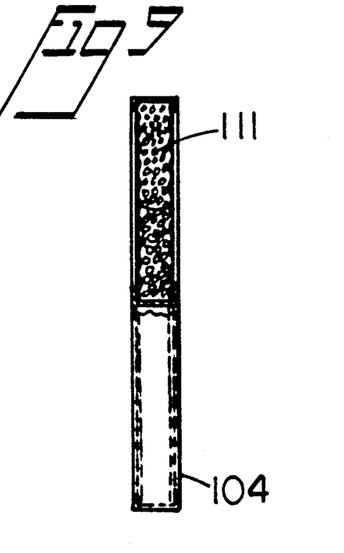

FIG. 7 shows a plurality of notches 40 grooved in the lower surface 50 of the saucer shaped base 26, to project radially so as to be adapted to bridge the lip 103 of the drinking cup 102. The notches are positioned to allow air to escape from, and to prevent pressure build-up in, the drinking cup 102.

The means for selecting a desired strength in a brewed beverage is a plurality of visual indicators 48 (FIG. 5) which are preferably provided on the upper surface 52 of the base 26 and a wedge shaped pointer 22 is included to project radially on the exterior surface of the vessel 12 adjacent to the upper surface 52 of the base 26. While the pointer 22 is positioned on the outer surface of the vessel, it is located directly lateral to the longitudinal slit 24 within the vessel 12 whereby the pointer, in conjunction with the visual indicators 48, indicates position of the upstanding flange 28 relative to the longitudinal slit 24. The pointer and visual indicators further demonstrate the hot water-filter particle contact time and the relative volume of hot water escaping through the slit 24 and circumventing the prepackaged filter 104 and indicate strength of the single portion of coffee or other beverage being brewed.

Figure 5:
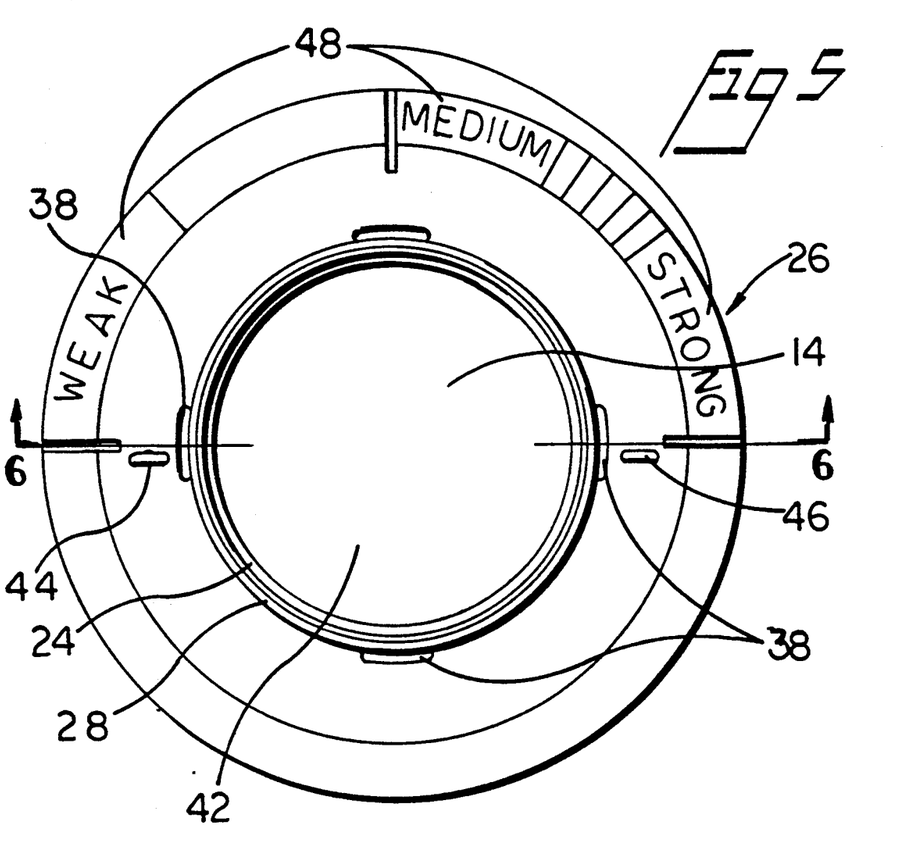
FIG. 5 is a top elevational view of the base of the device.
Figure 6:
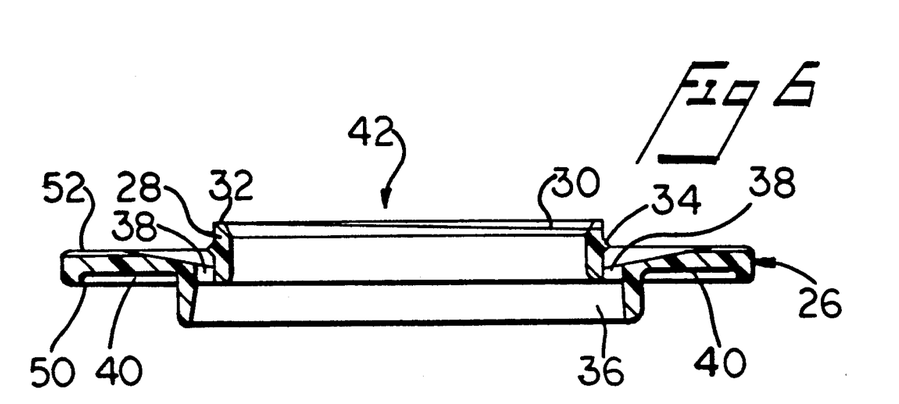
FIG. 6 is a sectional view of the saucer shaped base taken on line 6—6 of FIG. 5.

As seen in FIG. 5, first and second raised projections forming first and second stops 44,46 may be provided on the upper surface 52 of the saucer shaped base 26 which stops 44,46 are adapted to limit rotation of the vessel 12 by impinging on the wedge shaped pointer 22, the first stop 44, being positioned to impinge the pointer 22, when the longitudinal slit 24 is aligned with the first lowest point of the flange 30, and the stop projection 46 positioned to impinge the pointer 22 when the longitudinal slit 24 is aligned with the second highest point 32 of the flange 38. In the preferred embodiment, the first lowest point of the flange would be approximately 180°, more preferably 170°, around the circumference of the aperture from the second highest point of the flange and rotation of the vessel would be limited within the same 170°.

When the device for brewing of this invention 10 is in use, a prepackaged filter 104 containing a beverage precursor particles is positioned atop the ring 16 within the vessel 12. The vessel 12 can then be rotated about the base 26 thereby setting the bypass flow area of the longitudinal slit 24 against the smoothly rising flange 28. A portion of hot water (X+Y) is then poured into the vessel 12 thereby effectively creating a reservoir of hot water 106 above the filter 104. As the brewing process continues, some of the hot water poured into the vessel 12 passes through (volume X) the prepackaged filter 104, while some of the hot water flows through the longitudinal slit 24 to bypass (volume Y) the filter 104 and pour directly into the drinking cup 102.

Since the changes in size of the longitudinal slit 24 are controlled by rotation of the vessel 12 upon the base 26, the volume of water (Y) which flows through the slit 24 to bypass the filter 104 is easily regulated with precision. Hence, the volume of water (X) flowing through the filter, hot water-precursor particles contact time, extraction from precursor particles and final strength of brewed beverage are exactly controlled. The volume of hot water bypassing the filter (Y) may be determined as a percentage of hot water initially poured into the vessel (X+Y) when varied by fine adjustment (rotation) of the vessel 12 upon the base 26.

The preferred range for volume of bypass water (Y) to the initial volume of hot water (X+Y) has been found to be such that the effective brew time can be varied from approximately three minutes to 0.75 minutes which substantially alters the strength of brewed beverage.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A brewing device for preparing a cup or other portion of a beverage, especially coffee, to a desired strength using a portion of hot water and a disk-shaped, prepackaged filter containing a beverage precursor, the improvement comprising:
    a brewing vessel having openings at top and bottom, a ring surrounding said bottom opening to support said prepackaged filter within said vessel, and a longitudinal slit on the interior side of the vessel through a portion of said interior ring;
    a base having upper and lower surfaces and a central aperture surrounded by an integrally formed flange rising vertically from said upper surface; and,
    means for rotatably mounting said vessel atop said base.

2. The device described in claim 1, wherein the means for rotatably mounting comprises said flange having a height which increases smoothly from a first lowest point to a second highest point, said upstanding flange rotatably engaging said ring to rotatably affix said vessel to said base; and,
    said flange juxtaposed against said slit varies the effective flow area for bypass of water through said slit.

3. The device described in claim 1, wherein said means for rotatably mounting further comprises a groove on the interior wall of said ring adapted to receive a rib projecting peripherally on said upstanding flange adapting said ring to snap lock over said flange and restrain transverse movement of said vessel as it rotates upon said base.

4. The device described in claim 1, further comprising a lip projecting from said lower surface of said saucer shaped base surrounding said aperture radial to said flange, said lip adapted to fit and direct liquid into a drinking cup or other container having a volume substantially equal to said single portion.

5. The device described in claim 1, further comprising a shoulder portion located above said ring within said vessel for the purpose of further supporting and retaining said filter in position in said vessel.

6. The device described in claim 1, further comprising a plurality of slots through said base adjacent said flange in the radial area between said flange and said ring, said plurality flats adapted to drain liquid from said upper surface of said base into a drinking cup.

7. The device described in claim 6, further comprising:
    first and second raised projections forming first and second stops on the upper surface of said base adapted to limit rotation of said vessel by impinging said wedge shaped pointer, said first stop positioned to impinge said pointer when said longitudinal slit is aligned with said first lowest point of said flange, and said second stop positioned to impinge said pointer when said longitudinal slit is aligned with said second highest point of said flange.

8. The device described in claim 1, further comprising a plurality of notches radiating radially in the lower surface of said base, said notches adapted to bridge the lip of said drinking cup, and allow air escape from, and prevent pressure build-up in, said drinking cup.

9. The device described in claim 8, wherein said first lowest point of said flange is less than 180° around the circumference of said aperture from said second highest point of said flange and rotation of said vessel is limited within that 180°.

10. The device described in claim 1, further comprising:
    a plurality of visual indicators on said upper surface of said base and a wedge shaped pointer projecting radially on the exterior surface of said vessel adjacent the upper surface of said base, said pointer positioned lateral to said longitudinal slit on the interior side of said vessel and adapted to demonstrate in conjunction with said visual indicators the position of said longitudinal slit relative said upstanding flange, to further demonstrate the relative brew time and volume of hot water escaping through said slit and circumventing said filter and beverage precursor, and finally, to thereby demonstrate that brewed strength of said single portion of coffee or other beverage.

* * * * *